United States Patent [19]

Carper

[11] Patent Number: 4,997,109
[45] Date of Patent: Mar. 5, 1991

[54] MANUAL DISPENSING ICE STORAGE BUCKET

[75] Inventor: Dwight A. Carper, Lincoln Township, Berrien County, Mich.

[73] Assignee: Whirlpool Corporation, Benton Harbor, Mich.

[21] Appl. No.: 479,217

[22] Filed: Feb. 12, 1990

Related U.S. Application Data

[63] Continuation of Ser. No. 201,628, Jun. 2, 1988, abandoned.

[51] Int. Cl.⁵ .............................................. B67D 5/62
[52] U.S. Cl. .................................. 222/146.6; 222/240; 222/413; 198/550.1; 198/531; 198/671; 62/344
[58] Field of Search ...................... 222/242, 252, 146.6, 222/240, 413; 198/550.1, 531, 671; 62/344; 221/75, 236, 237

[56] References Cited

U.S. PATENT DOCUMENTS

| | | |
|---|---|---|
| 1,039,352 | 9/1912 | Bernotowicz . |
| 3,197,083 | 7/1968 | Elliott et al. .................... 222/231 |
| 3,570,720 | 3/1971 | Curry, III ........................ 222/240 |
| 3,602,406 | 8/1971 | Jacobus ............................ 222/413 |
| 3,809,295 | 5/1974 | Vitencz ............................ 222/183 |
| 3,878,693 | 4/1975 | Prada ............................. 62/344 X |
| 4,084,725 | 4/1978 | Buchser ............................ 221/75 |
| 4,136,803 | 1/1979 | Tobias et al. .................... 222/413 |
| 4,252,002 | 2/1981 | Mullins, Jr. ...................... 62/344 |
| 4,627,556 | 12/1986 | Brooks ........................... 222/240 |

Primary Examiner—Andres Kashnikow
Assistant Examiner—Gregory L. Huson
Attorney, Agent, or Firm—Wood, Phillips, Mason, Recktenwald & VanSanten

[57] ABSTRACT

An apparatus for dispensing ice bodies collected in a storage receptacle, including a manually operable knob and structure connected thereto for delivering ice bodies from the collecting bin to a transfer mechanism which, in turn, delivers the ice bodies one at a time through a discharge chute to a dispensing space. The apparatus is self-contained so as to permit removal thereof from the refrigeration apparatus for dispensing of the ice bodies by manual rotation of the knob at locations remote from the refrigeration apparatus, as well as in the installed arrangement within the refrigeration apparatus. Accurate dispensing of the ice bodies one at a time is effected without personal contact with the ice bodies. A guide is associated with the discharge structure for locating a receiver, such as a glass or pitcher, accurately to receive the transferred ice bodies. Gears are utilized to provide desired operation of a conveyor auger for transferring the ice bodies from the collecting bin to the transfer mechanism.

14 Claims, 3 Drawing Sheets

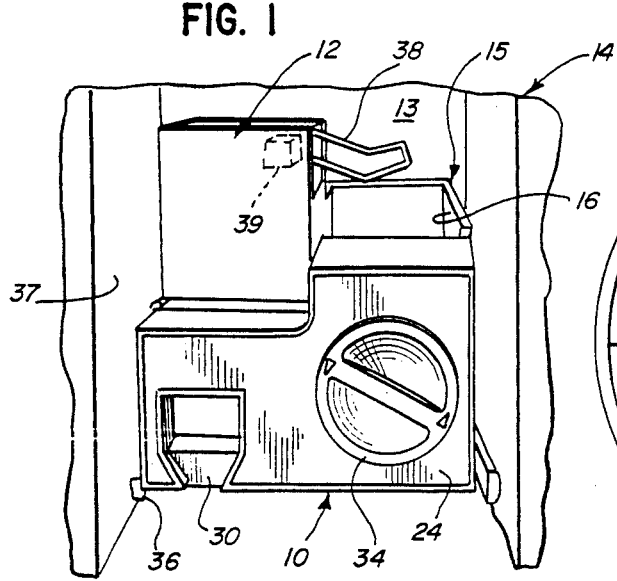
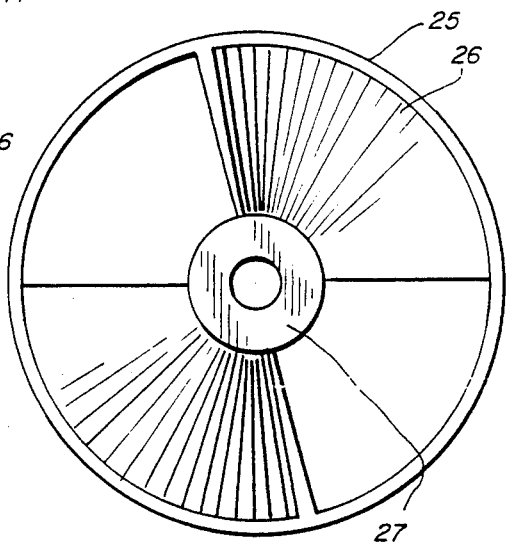
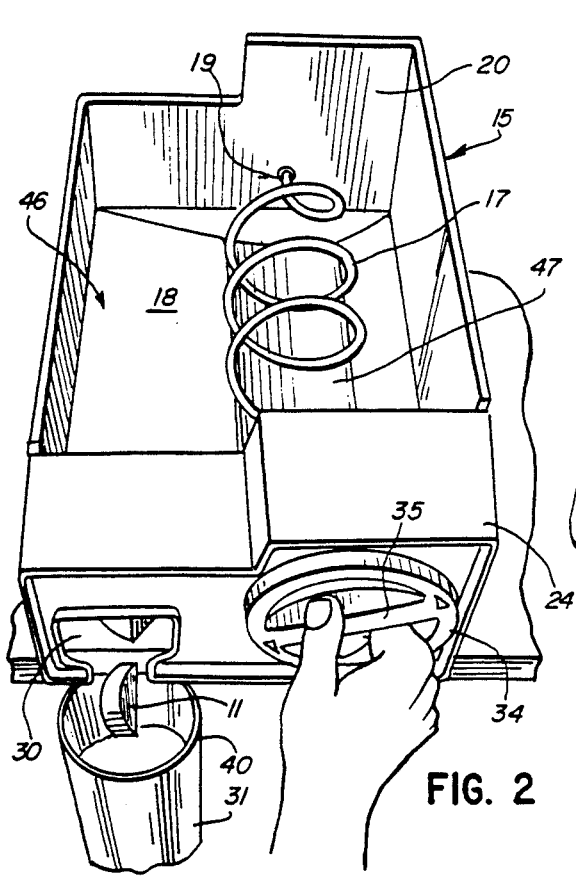
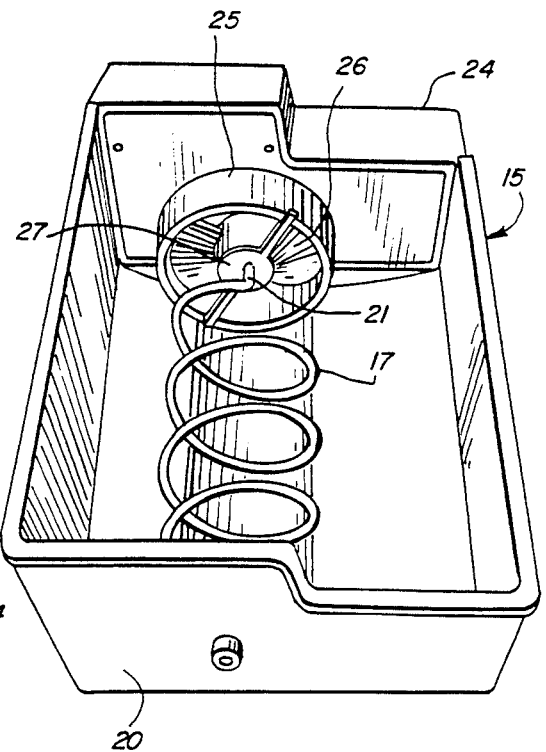

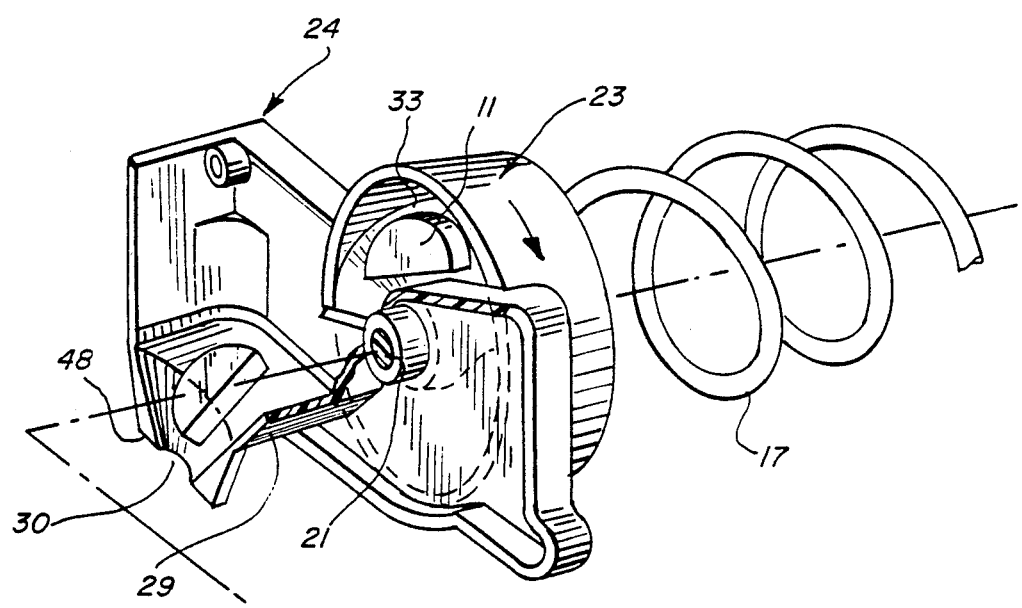
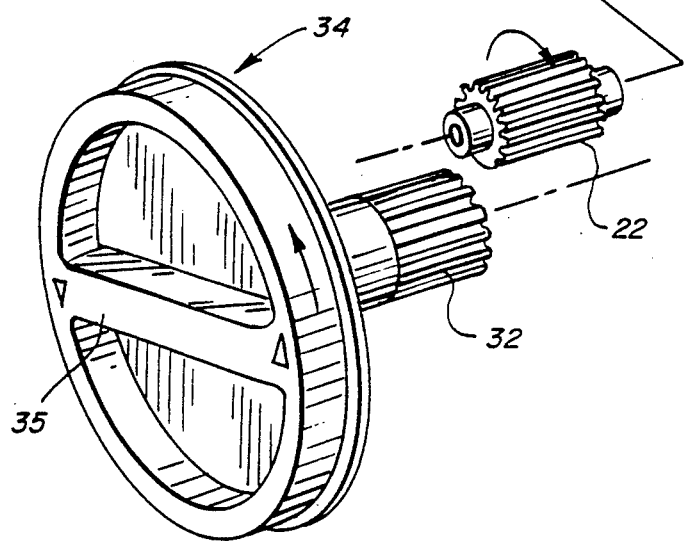
FIG. 7

MANUAL DISPENSING ICE STORAGE BUCKET

This application is a continuation of application Ser. No. 201,628, filed June 2, 1988, now abandoned.

TECHNICAL FIELD

This invention relates to ice body dispensers and in particular to apparatuses for collecting, storing, and dispensing ice bodies.

BACKGROUND ART

In one improved form of ice body maker, an automatic apparatus is provided for forming ice bodies and periodically delivering the formed ice bodies into a subjacent collecting bin maintained within a freezer space of the refrigeration apparatus. In one conventional form, the ice bodies are removed from the collecting bin by the user grasping the ice bodies through an open top of the collecting bin and removing the desired quantity.

In a further improved form of such automatic ice maker, an automatic dispensing means is provided for delivering the ice bodies from the collecting bin to a discharge chute for conducting the transferred ice bodies to a delivery space, wherein the ice bodies may be received in a suitable container, such as a glass or pitcher. One excellent example of such an automatic ice body dispenser is shown in U.S. Pat. No. 4,084,725 of William J. Buchser, which patent is owned by the assignee hereof. As shown in that patent, the ice bodies are delivered from the collecting bin to a transfer mechanism by means of an auger which is rotated by a motor at the rear end of the auger. The forward end of the auger is connected to the transfer mechanism which transfers the ice bodies seriatim to a subjacent transfer chute leading to the dispensing area.

Actuation of the drive motor may be effected by suitable switches connected to dispensing means at the dispensing position adapted to be engaged by the glass or pitcher ice body collector, so that the desired amount of ice bodies may be automatically transferred by the maintained energization of the drive motor.

DISCLOSURE OF INVENTION

The present invention is concerned with the provision of an ice body dispenser which eliminates the need for the motor drive of the auger and transfer mechanism and which permits selective disposition of the ice body dispenser within the refrigerated compartment or removed therefrom such as for delivering the ice bodies from the collecting bin thereof at a location remote from the refrigeration apparatus.

More specifically, the invention comprehends the provision of such an ice body dispenser having manually operable transfer apparatus mounted to the ice body collecting receptacle for transferring the ice bodies seriatim one at a time from the receptacle to a discharge means.

The invention comprehends the provision of such an ice body dispenser wherein the manually operable transfer apparatus includes a force transfer means mounted adjacent the discharge means and, in the illustrated embodiment, the discharge means and force transfer element are mounted on a front wall portion of the storage receptacle.

More specifically, the invention comprehends the provision of an apparatus for collecting, storing, and dispensing ice bodies including a storage receptacle having an open top portion for receiving the ice bodies as from an automatic ice maker, discharge means on the receptacle for discharging ice bodies to a delivery space, and manually operable transfer apparatus mounted to the receptacle adjacent the discharge means for transferring ice bodies one at a time from the receptacle to the discharge means at a variable rate of delivery.

In the illustrated embodiment, the ice dispenser further includes guide means on the receptacle for locating an edge portion of a portable container, such as a glass or pitcher, at the delivery space for delivering discharged ice bodies into the container.

Still further, in the illustrated embodiment, the ice body dispenser includes forming means for forming ice bodies and delivering the formed ice bodies through the receptacle open top portion into the receptacle, means for removably mounting the receptacle adjacent the forming means for receiving the formed ice bodies therefrom, and means for selectively preventing delivery of ice bodies from the forming means as when the receptacle is removed from adjacent the forming means.

In the illustrated embodiment, the transfer apparatus includes rotary mechanism for effecting transfer of ice bodies and a rotatable operator having manually operable force input means adjacent the discharge means and arranged to be engaged by a user's fingers for manually driving the rotary mechanism.

In the illustrated embodiment, the storage receptacle defines an upright wall and the rotatable operator is substantially recessed therein.

The rotary mechanism may include a conveyor in the receptacle for conveying the collected ice bodies therefrom and wall means on the receptacle for guiding the collected ice bodies to the conveyor.

The force input means, in the illustrated embodiment, comprises a rotatable member and means for permitting rotation of the rotatable member in only one direction of rotation. In the illustrated embodiment, the rotatable member is permitted to rotate only in a counterclockwise direction so as to urge the receptacle toward a desired disposition subjacent the ice forming means.

In the illustrated embodiment, the force input means comprises a knob having a diameter of at least approximately three inches.

The guide means comprises a portion of the receptacle defining a recess for at least partially receiving the portable container to which the ice bodies are delivered in the dispensing operation. In the illustrated embodiment, the delivery space is recessed in the receptacle.

The receptacle defines a front wall and, in the illustrated embodiment, the delivery space is provided in the front wall. The rotatable operator may be mounted in the front wall adjacent the delivery space.

The ice body dispenser of the present invention is extremely simple and economical of construction, while yet providing for improved manually controlled and driven ice body transfer from the collecting bin to a desired dispensing space.

BRIEF DESCRIPTION OF THE DRAWING

Other features and advantages of the invention will be apparent from the following description taken in connection with the accompanying drawing wherein:

FIG. 1 is a perspective view of an apparatus for collecting, storing, and dispensing ice bodies embodying the invention mounted in association with an ice forming means within a refrigerated space of a refrigeration apparatus;

FIG. 2 is a fragmentary perspective view illustrating the use of the apparatus for dispensing ice bodies to a collecting element, such as a glass;

FIG. 3 is a rear perspective view of the apparatus;

FIG. 4 is an elevation view of the ice body transfer means;

FIG. 7 is a fragmentary perspective view illustrating in greater detail the association of the auger, transfer mechanism, discharge means, and force transfer input means for manually operating the apparatus.

BEST MODE FOR CARRYING OUT THE INVENTION

Figure 5:
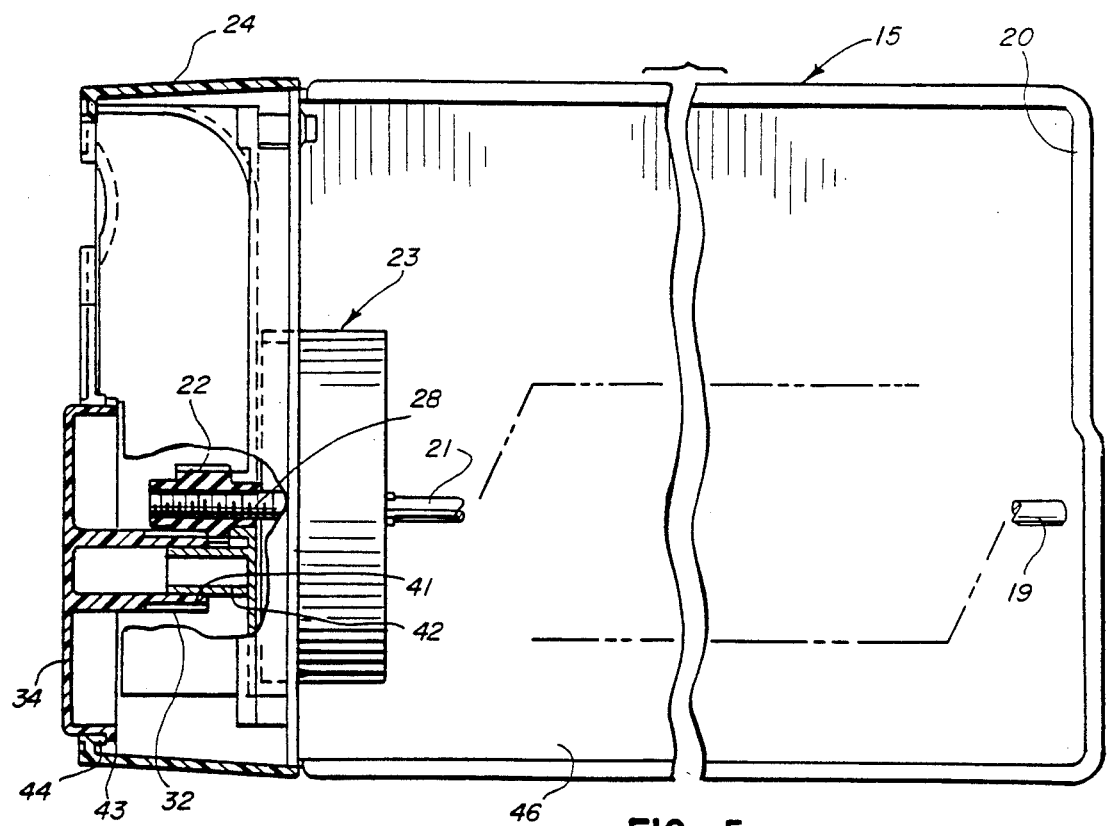
FIG. 5 is a fragmentary longitudinal horizontal section of the apparatus.

In the illustrative embodiment of the invention as disclosed in the drawing, an apparatus generally designated 10 is provided for collecting, storing and dispensing ice bodies 11 formed in an automatic ice maker 12. Apparatus 10 and ice maker 12 are mounted in a suitable refrigerated space 13, such as the freezer space of a refrigeration apparatus generally designated 14, as illustrated in FIG. 1.

As shown, apparatus 10 includes a storage receptacle generally designated 15 having an open top 16 for receiving ice bodies from the ice forming means 12. A helical conveyor auger 17 is mounted in a collecting space 18 of the storage receptacle and has one end 19 rotatably mounted in a rear wall 20 of receptacle 15. Front end 21 of the auger is connected to a drive gear 22 mounted in a transfer mechanism generally designated 23 in a front wall portion 24 of the receptacle.

Figure 6:
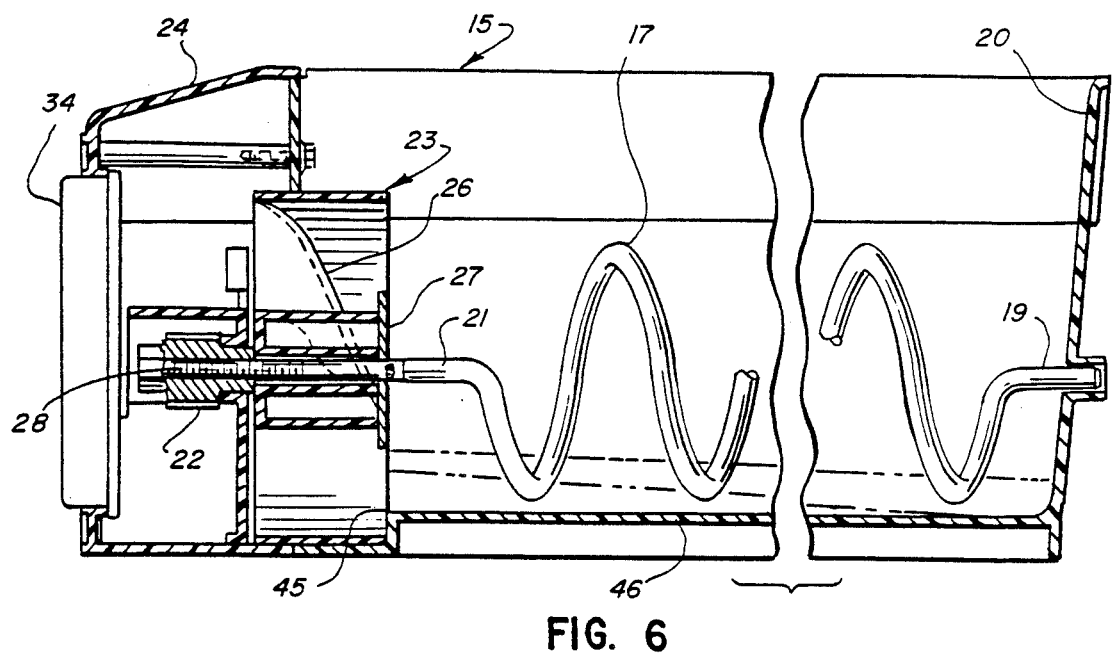
FIG. 6 is a fragmentary vertical longitudinal section of the apparatus.

Transfer mechanism 23 includes a tubular drum 25 having a helical flight 26 dividing the interior of the drum into a pair of helical passages The drum is provided with a hub 27 adapted to receive the front end 21 of the auger. As shown in FIG. 6, gear 22 is mounted to a threaded front end portion 28 of the auger end 21.

Transfer mechanism 23 functions similarly to the transfer mechanism in the above-identified Buchser U.S. Pat. No. 4,084,725, which patent is incorporated by reference herein for a more detailed disclosure of the transfer mechanism. However, it need be only understood that the transfer mechanism 23 comprises means for effectively transferring ice bodies from the collecting bin one at a time to a discharge chute 29 which guides the ice bodies to a dispensing space generally designated 30, where the ice bodies are dispensed into a suitable receiver, such as glass 31 shown in FIG. 2.

Helical auger 17 is rotated about its longitudinal axis as a result of rotation of gear 22 to which the front end 28 of the auger is secured, as indicated above. Gear 22 is rotated by a meshing gear 32 extending rearwardly from a force input member 34 comprising a rotatable operator in the form of a large diameter knob mounted for rotation on front wall portion 24 of the storage receptacle 15. In the illustrated embodiment, the knob has a diameter of approximately 3" and includes a transverse bar portion 35 adapted to be engaged at its opposite ends by a user's fingers so as to effect a counterclockwise rotation of gear 32, as illustrated in FIGS. 2 and 7. As shown in FIG. 2, the knob 34 is partially recessed in the front wall 24 laterally adjacent the dispensing space 30.

The apparatus may be is mounted on suitable supports 36 to be disposed suitably adjacent the ice maker 12 in the installed arrangement, as illustrated in FIG. 1. Counterclockwise rotation of knob 34 urges apparatus 10 to the left toward the sidewall 37 of the refrigeration apparatus 14 to maintain apparatus 10 removably on support 36 suitably subjacent the ice maker for receiving the ice bodies therefrom in the installed arrangement illustrated in FIG. 1. When it is desired, however, to remove the apparatus 10 from the refrigeration apparatus, it may be simply withdrawn from the support 36 for facilitated dispensing of the ice bodies from apparatus 10 at a location remote from the refrigeration apparatus, as desired. Reinstallation is effected by simply replacing the apparatus in the refrigerator space adjacent sidewall 37.

When apparatus 10 is removed from the refrigeration apparatus, it is desirable to prevent further operation of the ice maker 12. The ice maker includes a sensing arm 38 connected to a suitable control 39 for discontinuing operation of the ice maker upon positioning the sensing arm in an upper shutoff position, as illustrated in FIG. 1. Upon return of apparatus 10 to the position illustrated in FIG. 1 for receiving the ice bodies from the ice maker, the user need merely restore the sensing arm 38 to an operative position for continued manufacture of ice bodies and delivery thereof to the collection receptacle 15.

Bottom wall 46 of the receptacle defines a trough having its lowest portion 47 subjacent the auger 17 for facilitating movement of the collected ice bodies in the receptacle 15 to be engaged by the auger in conveying them to the transfer mechanism 23 upon counterclockwise rotation of knob 34. As indicated above, the drive of the auger is effected by gear 22 which causes the auger to rotate in a clockwise direction in effecting delivery of the ice bodies to the transfer mechanism.

As discussed above, rotation of the flights 26 within drum 25 of the transfer mechanism transfer ice bodies from the forward end of auger 17 one at a time to the discharge chute 29 for subsequent delivery through the dispensing space 30 into the receiver 31. By providing such seriatim delivery of the individual ice bodies, the user may accurately control the delivery of the desired amount of ice bodies to the receptacle 31.

Discharge chute 29 defines a lip 48 adapted to be engaged by the upper edge 40 of the receiver 31 so as to retain the receiver in accurate ice body receiving relationship to discharge chute 29 in the dispensing space 30.

Knob 34 includes a rearwardly extending mounting portion 41 rotatably mounted to a forwardly projecting trunnion 42 mounted to front wall 24 forwardly of drum 25. The knob is retained against axial displacement from the front wall by a radially outturned flange 43 cooperating with a rearturned flange 44 on the front wall 24, as shown in FIG. 5.

As shown in FIG. 6, ice bodies are delivered into drum 25 through an inlet opening 45 at the rear of the transfer mechanism, with the auger 17 urging the ice bodies seriatim through the opening into the drum for transfer by rotation of the flights 26 as a result of manipulation of knob 34, as discussed above.

Apparatus 10 is maintained in the installed disposition, as illustrated in FIG. 1, with the user obtaining ice bodies as desired by manipulation of knob 34.

When it is desired to dispense ice bodies at a remote location, such as on a tabletop, apparatus 10 may be lifted from the installed disposition of FIG. 1 and removed from the refrigeration apparatus to the desired remote point, whereupon manipulation of knob 34 may be effected to dispense the ice bodies in a similar manner as when dispensed in the refrigeration apparatus.

The use of apparatus 10 provides a highly sanitary dispensing of ice bodies eliminating the conventional use of the person's hand in directly contacting the ice bodies in removing them from the collecting bin in the conventional ice making and storing apparatus, wherein no transfer mechanism is provided. The present invention offers a substantial improvement over the automatic dispensing apparatuses of the prior art in permitting the use of the ice dispenser at remote locations by eliminating the need for electrical connections and the like. As discussed above, the collecting, storing, and dispensing apparatus 10 is extremely simple and economical of construction and may be utilized for providing improved sanitary and accurate dispensing of ice bodies.

The foregoing disclosure of specific embodiments is illustrative of the broad inventive concepts comprehended by the invention.

I claim:

1. An apparatus for collecting, storing, and dispensing ice bodies, said apparatus comprising:
   a portable storage receptacle removably mountable in a refrigeration space and having an open top portion for receiving ice bodies;
   discharge means on said receptacle for discharging ice bodies to a dispensing space; and
   manually operable transfer apparatus mounted to said receptacle adjacent said discharge means for transferring ice bodies one at a time from said receptacle to said discharge means at a variable rate of delivery at a location in or remote from the refrigeration space.

2. The apparatus of claim 1 wherein said transfer apparatus includes a force input member, and means permitting force input thereto in one direction only whereby force input to the force input member urges the storage receptacle in a corresponding single direction.

3. An apparatus for collecting, storing, and dispensing ice bodies, said apparatus comprising:
   a portable storage receptacle removably mountable in a refrigeration space and having an open top portion for receiving ice bodies;
   discharge means on said receptacle for discharging ice bodies to a dispensing space;
   manually operable transfer apparatus, operable at a location in or remote from the refrigeration space, and mounted to said receptacle adjacent said discharge means for transferring ice bodies one at a time from said receptacle to said discharge means; and
   guide means on said receptacle for locating an edge portion of a portable container at said dispensing space for delivery of discharged ice bodies into a container in said dispensing space.

4. The apparatus of claim 3 wherein said guide means comprises a portion of said receptacle defining a recess for at least partially receiving the portable container.

5. The apparatus of claim 3 wherein said dispensing space comprises a recess in said receptacle.

6. The apparatus of claim 3 wherein said receptacle defines a front wall and said dispensing space comprises a recess in said receptacle front wall.

7. An apparatus for collecting, storing, and dispensing ice bodies, said apparatus comprising:
   a portable storage receptacle having an open top portion for receiving ice bodies;
   discharge means on said receptacle for discharging ice bodies to a dispensing space;
   forming means in a refrigeration space for forming ice bodies and delivering the formed ice bodies through said receptacle open top into said receptacle;
   means for removably mounting said receptacle in the refrigeration space adjacent said forming means for receiving formed ice bodies; and manually operable transfer apparatus mounted to said receptacle adjacent said discharge means for transferring ice bodies one at a time from said receptacle to said discharge means when in a location in or remote from said refrigeration space;
   means for selectively preventing delivery of ice bodies from said forming means as when the receptacle is removed from adjacent said forming means.

8. The apparatus of claims 1, 3, or 7 wherein said transfer apparatus includes rotary mechanism for effecting transfer of ice bodies seriatim and a rotatable operator having manually operable means adjacent said discharge means arranged to be engaged by a user's finger for manually driving said rotary mechanism.

9. The apparatus of claims 1, 3, or 7 wherein said transfer apparatus includes rotary mechanism for effecting transfer of ice bodies seriatim and a rotatable operator having manually operable means adjacent said discharge means arranged to be engaged by a user's finger for manually driving said rotary mechanism, said storage receptacle defining an upright wall, and said rotatable operator being substantially received in said storage receptacle wall.

10. The apparatus of claims 1, 3, or 7 wherein said transfer apparatus includes rotary mechanism for effecting transfer of ice bodies seriatim and a rotatable operator having manually operable means adjacent said discharge means arranged to be engaged by a user's finger for manually driving said rotary mechanism, said rotary mechanism including a conveyor in said receptacle for conveying collected ice bodies therefrom, and wall means on said receptacle for guiding collected ice bodies to said conveyor.

11. The apparatus of claims 1, 3, or 7 wherein said transfer apparatus includes rotary mechanism for effecting transfer of ice bodies seriatim and a rotatable operator having manually operable means adjacent said discharge means arranged to be engaged by a user's finger for manually driving said rotary mechanism, and further comprising means for permitting rotation of said rotatable operator in only one direction of rotation.

12. The apparatus of claims 1, 3, or 7 wherein said transfer apparatus includes rotary mechanism for effecting transfer of ice bodies seriatim and a rotatable operator having manually operable means adjacent said discharge means arranged to be engaged by a user's finger for manually driving said rotary mechanism, said manually operable means comprises a knob having a diameter of at least 3".

13. The apparatus of claims 1, 3, or 7 wherein said receptacle includes a front wall and said transfer apparatus is mounted on said front wall.

14. The apparatus of claims 1, 3, or 7 wherein said receptacle includes a front wall, and said transfer apparatus includes a manually operable force input means mounted to said front wall.

* * * * *